(12) United States Patent
Hirons

(10) Patent No.: US 9,694,904 B2
(45) Date of Patent: Jul. 4, 2017

(54) CABLE CUTTER ANTENNA FOR AIRCRAFT

(71) Applicant: H.R. Smith (Technical Developments) Ltd, Leominster, Herefordshire (GB)

(72) Inventor: Paul Hirons, Herefordshire (GB)

(73) Assignee: H.R. Smith (Technical Developments) Limited, Herefordshire (GB)

( * ) Notice: Subject to any disclaimer, the term of this patent is extended or adjusted under 35 U.S.C. 154(b) by 0 days.

(21) Appl. No.: 14/777,935

(22) PCT Filed: Mar. 12, 2014

(86) PCT No.: PCT/GB2014/050730
§ 371 (c)(1),
(2) Date: Sep. 17, 2015

(87) PCT Pub. No.: WO2014/147372
PCT Pub. Date: Sep. 25, 2014

(65) Prior Publication Data
US 2016/0280365 A1    Sep. 29, 2016

(30) Foreign Application Priority Data
Mar. 18, 2013   (GB) .................................. 1304890.5

(51) Int. Cl.
*H01Q 1/28*    (2006.01)
*B64C 27/00*   (2006.01)
*B64C 1/36*    (2006.01)

(52) U.S. Cl.
CPC .............. *B64C 27/006* (2013.01); *B64C 1/36* (2013.01); *H01Q 1/28* (2013.01)

(58) Field of Classification Search
CPC   H01Q 1/082; H01Q 1/27; H01Q 1/28; H01Q 1/281; H01Q 1/282; H01Q 1/283;
(Continued)

(56) References Cited

U.S. PATENT DOCUMENTS 2,505,751 A * 5/1950 Bolljahn ................ H01Q 1/287
343/705
3,220,006 A   11/1965 Young
(Continued)

FOREIGN PATENT DOCUMENTS

| | | |
|---|---|---|
| EP | 0691738 A1 | 1/1996 |
| GB | 1447004 A | 8/1976 |
| WO | WO99/38770 A2 | 8/1999 |

*Primary Examiner* — Tho G Phan
*Assistant Examiner* — Patrick Holecek
(74) *Attorney, Agent, or Firm* — Kilpatrick Townsend & Stockton LLP

(57) ABSTRACT

A cable cutter (10) for an aircraft (27) comprises an electrically-conducting body (12) configured to be mounted on an aircraft (27) and to cut a cable and an electrically-conducting auxiliary member (38) attached to, and electrically isolated from, the body (12). The body (12) and auxiliary member (38) are configured to together form an antenna. A method of manufacturing an antenna for an aircraft comprises the steps of providing a cable cutter (10) for an aircraft, the cable cutter comprising an electrically-conducting body (12) configured to be mounted on an aircraft (27) and to cut a cable; providing an electrically conducting auxiliary member (38) and attaching it to the body (12) so as to be electrically isolated from the body (12); and providing an antenna connector (42) and connecting the terminals thereof to the body (12) and auxiliary member (38) respectively.

13 Claims, 2 Drawing Sheets

(58) Field of Classification Search
CPC . H01Q 1/285; H01Q 1/30; H01Q 1/40; B64C 1/00–1/406; B64C 27/00–27/82
USPC ............... 343/705, 706, 708, 712, 713, 720
See application file for complete search history.

(56) References Cited

U.S. PATENT DOCUMENTS

| | | | | |
|---|---|---|---|---|
| 3,487,463 | A | | 12/1969 | Rogers |
| 3,587,102 | A | * | 6/1971 | Czerwinski ............. H01Q 1/28 343/708 |
| 4,117,490 | A | * | 9/1978 | Arnold .................... H01Q 1/28 343/708 |
| 4,215,833 | A | * | 8/1980 | Chan .................... B64C 27/006 244/17.11 |
| 4,826,103 | A | * | 5/1989 | McKown ............. B64C 27/006 114/221 A |
| 5,217,183 | A | * | 6/1993 | Liautaud ................ B64C 25/52 244/100 R |
| 5,288,036 | A | * | 2/1994 | Kompare ............. B64C 27/006 114/221 A |
| 5,415,364 | A | * | 5/1995 | Grant .................... B64C 27/006 244/121 |
| 7,721,993 | B2 | * | 5/2010 | Law ..................... B64C 27/006 244/1 A |
| 8,902,112 | B2 | * | 12/2014 | Dutruc ................ B64C 27/006 343/705 |
| 9,114,873 | B2 | * | 8/2015 | Claeys ................ B64C 27/006 |
| 2008/0169988 | A1 | * | 7/2008 | Deaett .................. H01Q 1/287 343/708 |

* cited by examiner

CABLE CUTTER ANTENNA FOR AIRCRAFT

TECHNICAL FIELD

The present invention relates to cable cutters for aircraft, in particular but not exclusively cable cutters for helicopters.

BACKGROUND ART

Aircraft such as helicopters may be provided with one or more cable cutters to protect the aircraft from catastrophic damage due to impact with an aerial wire or cable during flight.

Such a device is known from U.S. Pat. No. 4,215,833, incorporated by reference, which discloses a cable-cutting device comprising a pair of co-acting cable-cutting edges arranged at a suitable angle to produce a wedge-like mechanical advantage to at least partially cut a cable so that the cable will fail under moderate tension.

WO 99/38770, also incorporated by reference, suggests that the device of U.S. Pat. No. 4,215,833 is mounted on a helicopter in the position that is optimal for the installation of an antenna, making it necessary to select another—less than optimal—position for the antenna. It goes on to disclose a combined wire strike protector and antenna device that is mounted on an aircraft in the optimal location for an antenna and at the required position for the wire strike protector. The device includes a wire cutter having a forwardly open throat and a deflector plate projecting upwardly from the cutter for deflecting wires into the throat. The antenna component is a slot antenna including a conductive plate extending rearwardly from the deflector and a slot in the plate.

DISCLOSURE OF INVENTION

According to the present invention, there is provided:
a cable cutter for an aircraft, the cable cutter comprising:
an electrically-conducting body configured to be mounted on an aircraft and to cut a cable;
an electrically-conducting auxiliary member attached to, and electrically isolated from, the body;
wherein the body and auxiliary member are configured to together form an antenna.

The present invention addresses the problem, mentioned above, of a cable cutter typically being positioned (above and below the helicopter cabin in a forward position) in a location that is ideal for a VHF/UHF communication antenna. It further addresses the problem with standard monopole antennas installed in aircraft made from a non-conductive composite material, of having to provide a metallic 'ground plane' to act as the 'counterpoise' or negative element in order that the antenna might work correctly.

The body may form the negative element of the antenna. The auxiliary member may form the positive element of the antenna.

The body may comprise metal. The auxiliary member may comprise metal.

The body may comprise a blade configured to cut a cable. The body may comprise a guide member configured to guide a cable to the blade. The guide member may have a proximal end near the blade and a distal end remote from the blade.

The auxiliary member may be attached to, and electrically isolated from, the distal end of the guide member.

The auxiliary member may additionally be attached to, and electrically isolated from, the body at a point spaced from the distal end of the guide member.

The auxiliary member may be elongate with opposite ends, one end being attached to, and electrically isolated from, the distal end of the guide member and the other end being attached to, and electrically isolated from, the body.

The body may comprise a U-shaped yoke having two arms joined by a base. Each arm may carry a blade. The guide member may be contiguous with one arm of the U-shaped yoke. The auxiliary member may be attached to, and electrically isolated from, the base of the U-shaped yoke.

The auxiliary member may be tubular.

The auxiliary member may be arcuate in form, the arc being coplanar with the longitudinal axis of the elongate member.

The longitudinal axis of the elongate member may be coplanar with the guide arm.

The auxiliary member may be configured to match the antenna to 50'Ω.

The cable cutter may comprise a dielectric member configured to support the elongate auxiliary member relative to the body at a point between its opposite ends. It may support the elongate auxiliary member at a midpoint thereof. The dielectric member may be elongate with opposite ends attached to the body and the auxiliary member respectively.

The cable cutter may comprise a coaxial connector having terminals connected to the body and to the auxiliary member respectively.

The present invention also provides a method of manufacturing an antenna for an aircraft, the method comprising the steps of:
providing a cable cutter for an aircraft, the cable cutter comprising an electrically-conducting body configured to be mounted on an aircraft and to cut a cable;
providing an electrically conducting auxiliary member and attaching it to the body so as to be electrically isolated from the body; and
providing an antenna connector and connecting the terminals thereof to the body and auxiliary member respectively.

The method aspects of the invention can be particularlised using features of the apparatus described above.

BRIEF DESCRIPTION OF DRAWING

An embodiment of the invention will now be described by way of example with reference to the accompanying figures, of which.

DETAILED DESCRIPTION OF SPECIFIC EMBODIMENTS

Figure 1:
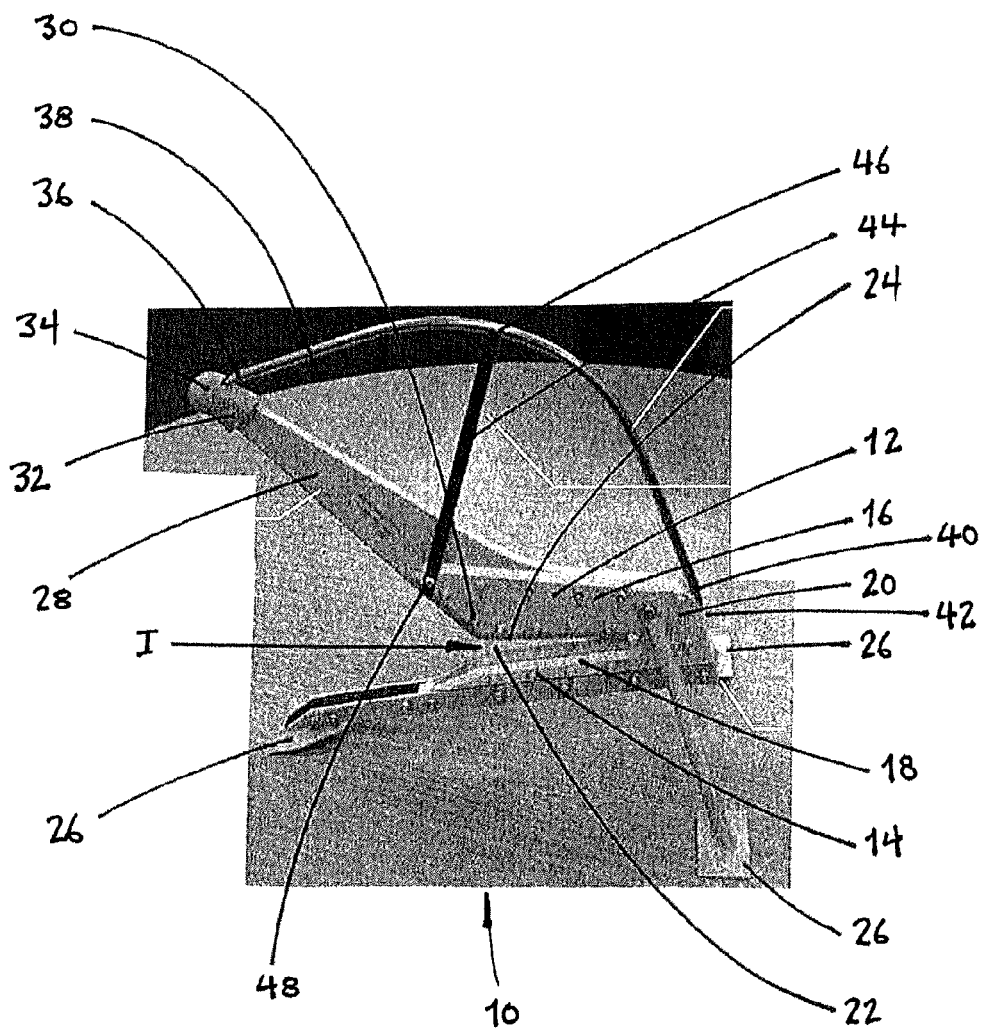
FIG. 1 is a perspective view of an embodiment of the invention.
Figure 2:
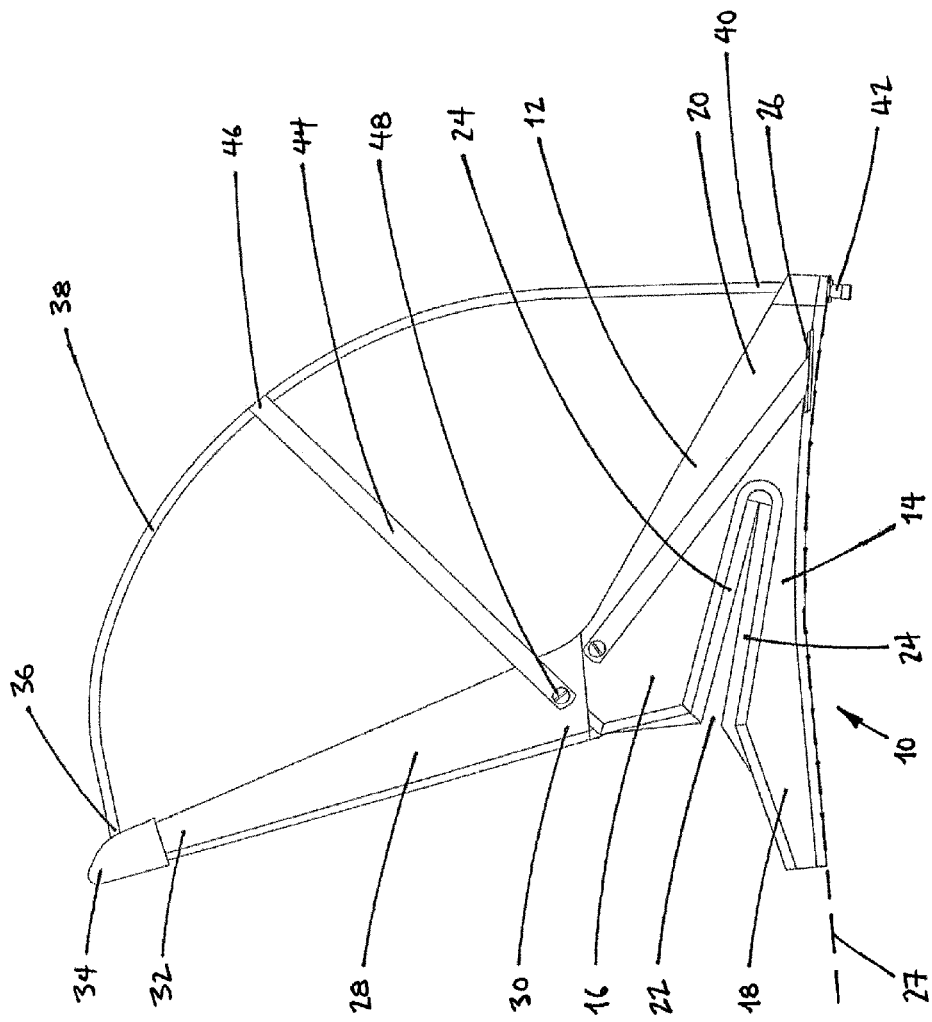
FIG. 2 is a side view of an embodiment of the invention.

Referring to the figures, a standard, off-the-shelf cable cutter 10 has an electrically-conducting metallic body 12 comprising a U-shaped yoke 14 having upper and lower arms 16,18 joined at their ends by a base 20. The mouth 22 of the U-shaped yoke has blades 24 on each arm that are inclined so as to sever a cable entering the mouth, as is well known, e.g. from the aforementioned U.S. Pat. No. 4,215, 833 and WO99/38770. As shown, the body 12 is oriented to be mounted on the top surface of a helicopter cabin (indicated by dashed line 27) by means of feet 26; however, it may equally be mounted in reverse orientation on the bottom of a helicopter cabin. As mentioned above, these locations are typically also ideal for a VHF/UHF communication antenna.

Contiguous with and attached to the upper arm 16 is a guide member 28 that points in, and is inclined to, the direction of travel (typically forward) so as to guide any incoming cable into the mouth 22 of the yoke 14, as indicated by arrow I. The guide member 28 has a proximal end 30 near the blades 24 and a distal end 32 remote from the blades 24. Distal end typically extends to a height of around 45 cm above the surface 27 of the cabin.

An electrically-conducting metallic element 38, which may be of aluminium or copper, is attached at one end 36 to the distal end 32 of the guide member 28 by means of an electrically insulating cap 34. Whilst element 38 could be planar in cross-section, a tubular cross-section has been found to work better. At its other end 40, the metallic element 38 is electrically connected to one terminal of a co-axial connector 42. Connector 42 is at a location spaced from the distal end of the guide member and adjacent the base 20 of the U-shaped yoke 14. The other terminal of the co-axial connector 42 is electrically connected to the base. The body of the connector may also be physically secured to the base, thereby forming a unit with the cable cutter and metallic element 38. Together, the electrically-conducting metal body 12 and electrically-conducting metallic element 38 form the negative and positive elements of a dipole antenna. The coaxial connector 42 allows this antenna to be connected e.g. to the cable of a VHF/UHF radio within the helicopter cabin. The metallic element 38 may be configured to match the antenna to the standard impedance of 50'Ω of co-axial connections between radio and antenna, and to this end may employ additional components as necessary.

As shown, metallic element 38 traces an arc between its two ends 36, 40, i.e. an arc coplanar with its longitudinal axis and with the guide arm 28. Such a curved shape may be easier to manufacture than an alternative made from straight segments. To support the element, an elongate electrically-insulating dielectric member 44 is provided, one end 46 of the member 44 being attached to a central midpoint on the metallic element 38, the other end 48 being attached to the body.

A standard cable cutter can be upgraded/modified to incorporate the invention by the addition of a metallic element 38, electrically insulating cap 34, co-axial connector 42 and dielectric support 44 as follows. One end of the metallic element 38 is attached to the body 12 of the cutter by means of the electrically-insulating cap 34 while the other end is electrically and physically connected to a terminal of a co-axial connector 42, the other terminal being electrically connected to the body of the cutter. Connector 42 and support 44 are also physically secured to the body, the other end of the support 44 being attached to the centre of the metallic element 38.

It should be understood that this invention has been described by way of examples only and that a wide variety of modifications can be made without departing from the scope of the invention.

The invention claimed is:

1. A cable cutter for an aircraft, the cable cutter comprising:
    an electrically-conducting body configured to be mounted on an aircraft and to cut a cable wherein the electrically-conducting body comprises a blade configured to cut a cable, and a guide member configured to guide the cable to the blade;
    an electrically-conducting auxiliary member attached to, and electrically isolated from the electrically-conducting body; and
    wherein the electrically-conducting body and auxiliary member are configured to together form an antenna.

2. A cable cutter according to claim 1, wherein the electrically-conducting body forms a negative element of the antenna and the auxiliary member forms a positive element of the antenna.

3. A cable cutter according to claim 1, wherein the guide member has a proximal end near the blade and a distal end remote from the blade, the auxiliary member being attached to, and electrically isolated from, the distal end of the guide member.

4. A cable cutter according to claim 3, wherein the auxiliary member is additionally attached to, and electrically isolated from, the electrically-conducting body at a point spaced from the distal end of the guide member.

5. A cable cutter according to claim 3, wherein the auxiliary member is elongate with opposite ends, one end being attached to, and electrically isolated from, the distal end of the guide member and the other end being attached to, and electrically isolated from, the electrically-conducting body.

6. A cable cutter according to claim 1, wherein the electrically-conducting body comprises a U-shaped yoke having two arms joined by a base.

7. A cable cutter according to claim 6, wherein each arm carries a blade.

8. A cable cutter according to claim 6, wherein the guide member is contiguous with one arm of the U-shaped yoke.

9. A cable cutter according to claim 6, wherein the auxiliary member is attached to, and electrically isolated from, the base of the U-shaped yoke.

10. A cable cutter according to claim 1, wherein the auxiliary member is arcuate in form, the arc being coplanar with a longitudinal axis of the auxiliary member.

11. A cable cutter according to claim 10, wherein the auxiliary member is elongate and has a longitudinal axis that is coplanar with the guide member.

12. A cable cutter according to claim 11 and comprising a dielectric member configured to support the auxiliary member relative to the electrically-conducting body at a point between its opposite ends.

13. A method of manufacturing an antenna for an aircraft, the method comprising the steps of:
    providing a cable cutter for an aircraft, the cable cutter comprising an electrically-conducting body configured to be mounted on an aircraft and to cut a cable, wherein the electrically-conducting body comprises a blade configured to cut a cable, and a guide member configured to guide the cable to the blade;
    providing an electrically conducting auxiliary member and attaching it to the electrically-conducting body so as to be electrically isolated from the electrically-conducting body; and
    providing an antenna connector and connecting terminals thereof to the electrically-conducting body and auxiliary member respectively.

* * * * *